US008037450B2

(12) United States Patent
Goebel

(10) Patent No.: US 8,037,450 B2
(45) Date of Patent: Oct. 11, 2011

(54) SYSTEM AND METHODS FOR TRACING CODE GENERATION IN TEMPLATE ENGINES

(75) Inventor: Steffen Goebel, Dresden (DE)

(73) Assignee: SAP AG, Walldorf (DE)

( * ) Notice: Subject to any disclaimer, the term of this patent is extended or adjusted under 35 U.S.C. 154(b) by 950 days.

(21) Appl. No.: 11/897,416

(22) Filed: Aug. 29, 2007

(65) Prior Publication Data

US 2009/0064096 A1    Mar. 5, 2009

(51) Int. Cl.
*G06F 9/44* (2006.01)
(52) U.S. Cl. .......................... 717/106; 717/128
(58) Field of Classification Search .................. 717/128, 717/106
See application file for complete search history.

(56) References Cited

U.S. PATENT DOCUMENTS

| | | | | |
|---|---|---|---|---|
| 5,875,331 | A * | 2/1999 | Lindsey | 717/108 |
| 7,320,007 | B1 * | 1/2008 | Chang | 715/700 |
| 7,676,756 | B2 * | 3/2010 | Vedula et al. | 715/763 |
| 2007/0168979 | A1 * | 7/2007 | Kumar et al. | 717/124 |

OTHER PUBLICATIONS

Giuseppe Naccarato, "Template-Based Code Generation with Apache Velocity, Part 1", May 5, 2004, retrieved from http://onjava.com/pub/a/onjava/2004/05/05/cg-vel1.html.*
A. Berre, B. Elvesaeter, J. Aagedal, J. Oldevik, A. Solberg, P. Desfray, and G. Raymond, "COMET: Component and Model-Based Development Methodology," COMET Toolset Handbook, pp. 22-46. Ver. 2.4, Apr. 2004.
K. Czarnecki and S. Helsen, "Feature-Based Survey of Model Transformation Approaches," IBM Systerms Journal, IBMSJ, vol. 45, No. 3, pp. 621-646. Jul. 2006.
Terence Parr, "A Functional Language for Generating Structured Text," University of San Francisco, 2006.

* cited by examiner

*Primary Examiner* — Philip Wang
(74) *Attorney, Agent, or Firm* — Fountainhead Law Group PC

(57) ABSTRACT

Embodiments of the present invention include systems and methods for improved tracing code generation in template engines. Certain embodiments of the present invention may have a number of advantages as compared to many existing tracing engines. The creation of an execution log while generation code coupled with the tracing capabilities increases the convenience and turnaround time in generating code.

20 Claims, 11 Drawing Sheets

SYSTEM AND METHODS FOR TRACING CODE GENERATION IN TEMPLATE ENGINES

BACKGROUND

The present invention relates to code generation, and in particular, to systems and methods for tracing code generation in template engines.

As technology progresses, computer systems have taken on more duties than ever before. For example, computer systems control the behavior of everyday devices such as mobile phones, automobiles, and various government networks that we depend on. This has led to an increasing demand for properly designed, bug-free software.

Generally speaking, software programs are developed by a computer programmer writing source code in a specific language. This source code is written to perform a specific action. Depending on the task at hand, the length of the source code may range from a few lines to hundreds of pages. In some instances, the source code may span over multiple files. In FIG. 1, source code 110 is received by compiler 120. As shown, source code 110 has been broken into multiple files. Compilers receive source code in a specific language and compile the code into an executable to be interpreted as a program by a computer. Therefore, compilers serve as a bridge between source code that is easily understood by programmers and space-efficient executable binaries that are understood by computers. After receiving all the files, compiler 120 converts the source code into executable 130. This executable may then be received as an input to a computer system.

In the software development model illustrated in FIG. 1, the programmer is responsible for both the technical and creative aspects required in developing a computer program. One common way to alleviate this burden on the programmer is by introducing template engines. A template engine increases the level of abstraction in the software development model by allowing the application to be developed apart from the formalities of the source code. In FIG. 2, template engine 230 receives template 210 along with model 220 and generates generated code 240. Template 210 describes the formalities of generated code 240 while model 220 describes the behavior. Similar to code 110 in FIG. 1, generated code 240 may be received by a compiler and converted into an executable.

The use of template engines allows software development to be separated based on skill-set. For example, programmers with a high degree of creativity may develop the models while programmers with in depth knowledge of the programming language may develop the templates. Furthermore, template engines enhance productivity by reducing unnecessary reproduction of effort. However, debugging the templates and models can be extremely difficult with existing technology. The source of problems in generated code are difficult to discover because after generating the code, it is impossible to determine the portions of the template and model that went into generating a piece of code. While mechanisms for debugging generated code do exist, they are often very cumbersome and include the strenuous exercise of stepping through a debugger.

Thus, there is a need for the ability to trace code generation in template engines. The present invention solves these and other problems by providing systems and methods of tracing code generation in template engines.

SUMMARY

Embodiments of the present invention include to systems and methods for tracing code generation in template engines.

In one embodiment, the present invention includes a computer-implemented method of tracing code generation comprising receiving a template comprising one or more instructions, generating an output file, wherein the output file is generated in response to the template, and generating an execution log, wherein the execution log maps a first code segment from the output file to a first instruction belonging to said template.

In another embodiment, the present invention includes a computer system apparatus including software for tracing code generation comprising a template engine, wherein the template engine receives a template and generates an output file comprising a plurality of code segments, a log generator for generating an execution log, wherein the execution log includes a mapping from a first code segment in the output file to at least one instruction from the template used to generate the first code segment, a code tracing engine, wherein the code tracing engine receives the template, the output file, and the execution log and determines the portion of the template used in generating a first code segment of the output file, and at least one browser that displays the portion of the template used in generating the first code segment of the output file.

In another embodiment, the present invention includes a computer-readable medium containing instructions for controlling a computer system to perform a method of tracing generated code, the method comprising displaying an output file, wherein the output file comprises a first code segment generated in response to at least one instruction in a template and at least one data set in a model, displaying an execution log, wherein the execution log includes the at least one instruction and the at least one data set used to generate the first code segment, displaying at least a portion of the model, displaying at least a portion of the template, and selecting the first code segment, and in accordance therewith, identifying the at least one instruction in the execution log and the template and identifying the at least one data set in the execution log and the model.

These and other features of the present invention are detailed in the following drawings and related description.

DETAILED DESCRIPTION

Described herein are techniques for tracing code generation in template engines. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
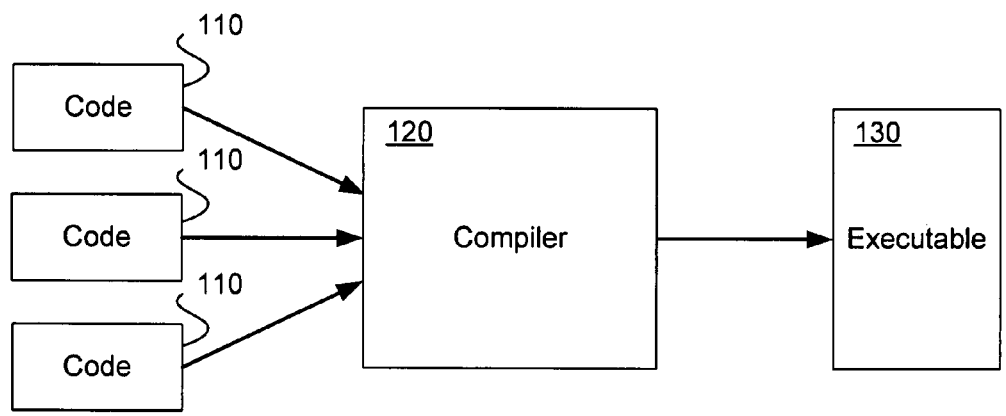
FIG. 1 illustrates a system for generating executables.
Figure 2:
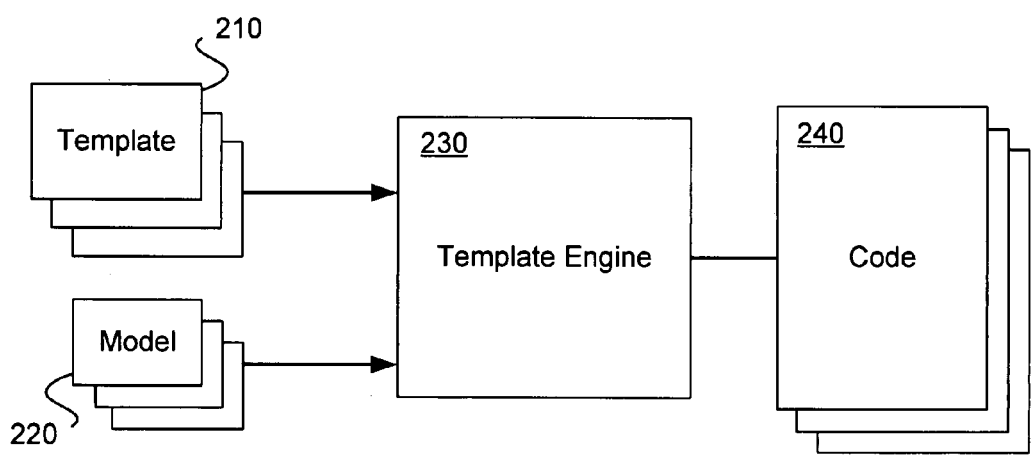
FIG. 2 illustrates a system for generating code.
Figure 3:
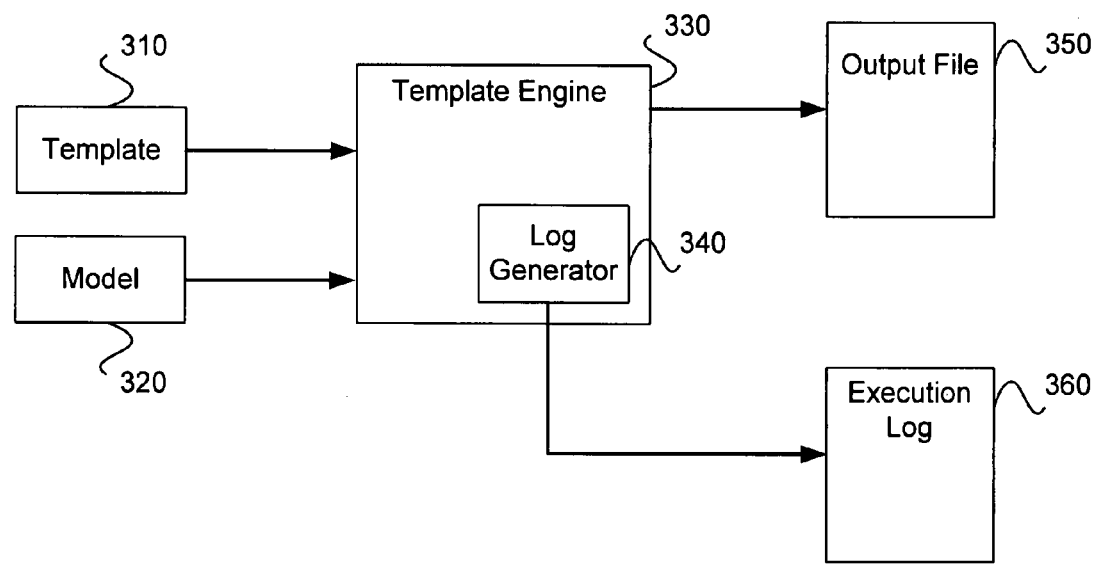
FIG. 3 is a system for code generation according to one embodiment of the present invention.

FIG. 3 is a system for tracing code generation according to one embodiment of the present invention. In this system, template engine 330 may receive template 310 and model 320, which may be files on a computer system, for example. Template 310 may include a series of instructions to be executed by template engine 330. These instructions may comply with a template language that is understood by template engine 330. The instructions may include static text (i.e. text which is output without modification), modularization instructions (i.e. instructions which help create structure in complex templates), flow instructions (i.e. instructions which control the flow), and access instructions (instructions which access data elements). The access instructions may call for data elements from model 320. Through these instructions, template 310 describes how output file 350 is constructed. In one embodiment, output file 350 is dependent on model 320 due to the access instructions.

Template engine 330 according to embodiments of the present invention may comprise log generator 340. Log generator 340 may save in execution log 360 some or all of the instructions executed in generating output file 350. In one embodiment, a sequence of instructions and the code segments generated from each of those instructions are stored in execution log 360 to illustrate the order the instructions were executed and the code generated by each instruction. This may be used to examine how output file 350 was constructed. In particular, execution log 360 may allow a user to discover which instructions from template 310 together with which model data elements from model 320 were used to generate a certain piece of code in output file 350. This functionality, also known as traceability, creates a connection from output file 350 to template 310 and model 320 that can be useful for locating bugs during the development of templates.

Figure 4:
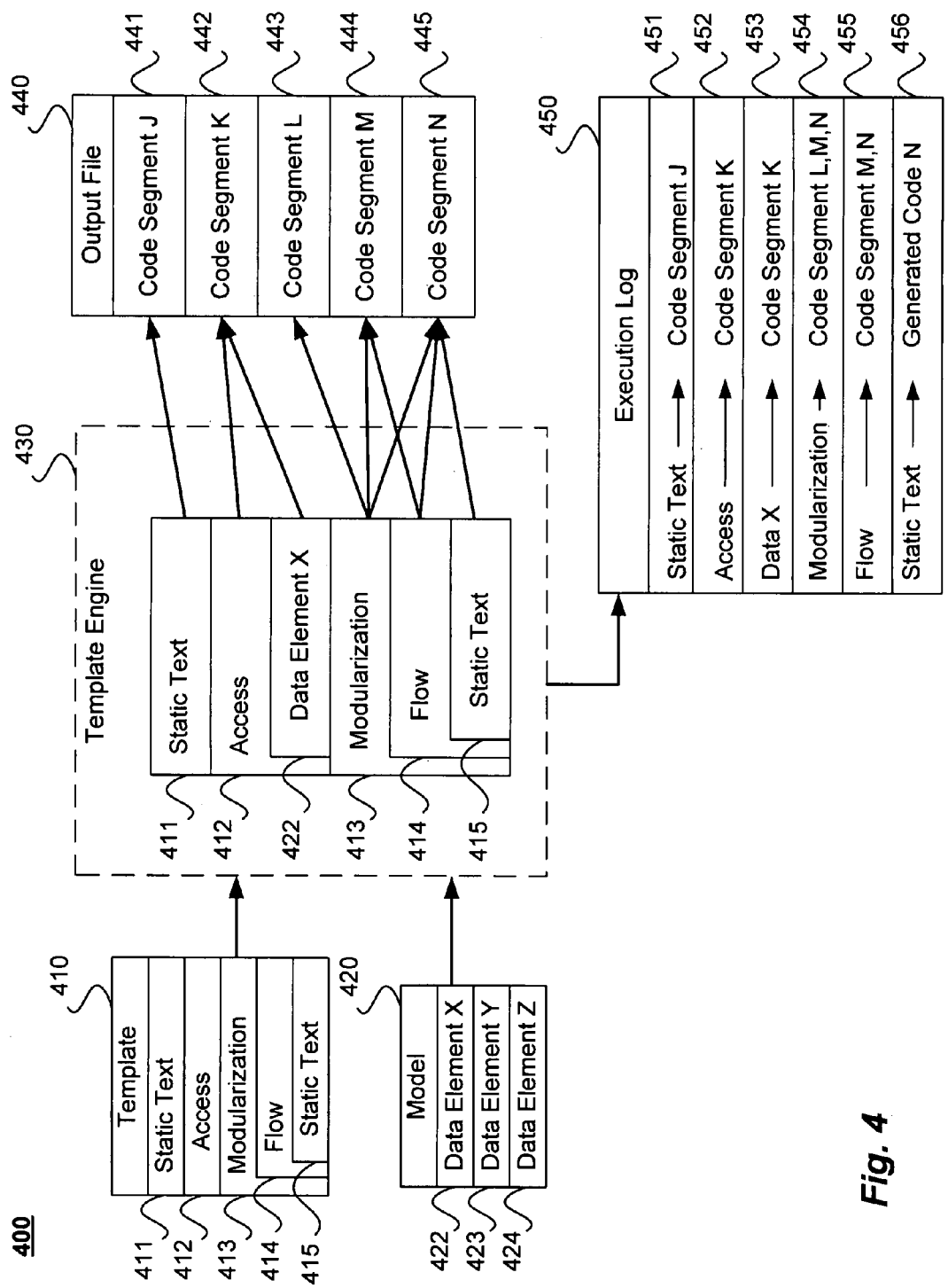
FIG. 4 is an example of a system for code generation according to one embodiment of the present invention.

FIG. 4 is an example of a system for code generation according to one embodiment of the present invention. In this example, output file 440 and execution log 450 are generated from template 410 and model 420 by template engine 430. Template 410 includes a set of instructions to be executed by template engine 430. These instructions include a static text instruction (e.g. instruction A), an access instruction (e.g. instruction B), a modularization instruction (e.g. instruction C), and a flow instruction (e.g. instruction D). Model 420 includes a set of data elements that may be used by the template engine to perform the instructions of template 410. The first instruction executed by template engine 430 is instruction 411 ("Instruction A"), a static text instruction not dependant on other instructions or data elements. Once executed, code segment 441 ("Code Segment J") is written in output file 440. The mapping from the completed instruction to the generated code segment is stored in execution log 450 at 451. The next instruction executed by template engine 430 is instruction 412 ("Instruction B"). In this example, instruction 412 is an access instruction which accesses data element 422 ("Data Element X") of model 420 to generate code segment 442 ("Code Segment K"). After execution, mapping between the instruction and code segment is stored in execution log 450 at 452. Since data element 422 was accessed while generating the code segment stored at 442, mapping between the data element and corresponding code segment is stored in execution log 450 at 453.

The next instruction executed is instruction 413 ("Instruction C"). Instruction 413 is a modularization instruction and therefore requires execution of instruction 414 ("Instruction D") prior to its completion. Similarly, instruction 414 is a flow instruction that depends on completion of instruction 415 ("Instruction F") before its own completion. The combination of these partially-executed instructions may create a processing stack comprising a series of nested instructions. As the partially-executed instructions are completed, the processing stack may decrease in size. Instructions that call on other instructions or data elements may add to the processing stack. In this example, instruction 415 is executed and code segment 445 ("Code Segment N") is generated. The mapping between the instruction and the code segment are both stored in execution log 450 at 456. After completion of instruction 415, instruction 414 may now complete execution. Once completed, code segment 444 ("Code Segment M") is generated. The execution log maps the instruction to code segments stored at 444 and 445 since instruction 414 was involved in the creation of both code segments. Similarly, instruction 413 will be mapped to code segments J, K, and L at line 454 in execution log 450 since it was involved in the creation of all three code segment. In one embodiment, the stored mappings in execution log 450 may be analyzed by a debugger to determine the cause of improperly generated code.

Figure 5:
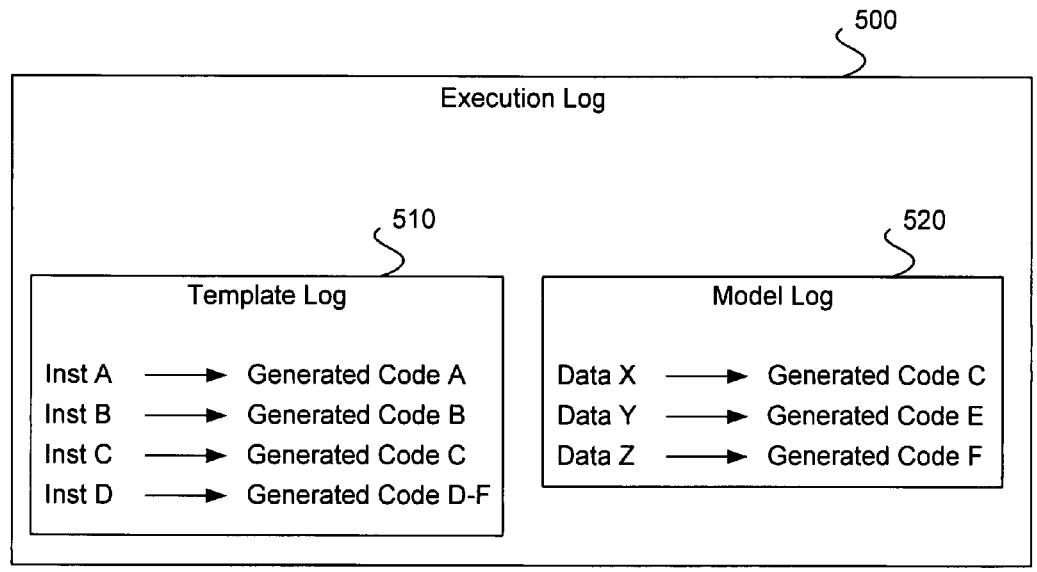
FIG. 5 is an execution log according to one embodiment of the present invention.

FIG. 5 is an execution log according to one embodiment of the present invention. Execution log 500 includes template log 510 and model log 520. Template log 510 stores the mapping between instructions and the code generated from each instruction. Similarly, model log 520 stores the mapping between data elements and corresponding code generated from each data element. In one embodiment, all the instructions belong to one template and all the data elements belong to one model. This segregation of template instructions and model data elements, in contrast to execution log 450 in FIG. 4 where they are combined, may lead to performance gains and file size reduction in the execution log. Some of these advantages are discussed in FIG. 6-8. It will be evident to one skilled in the art that the example template logs presented here may be combined to form a variety of template logs and model logs.

Figure 6:
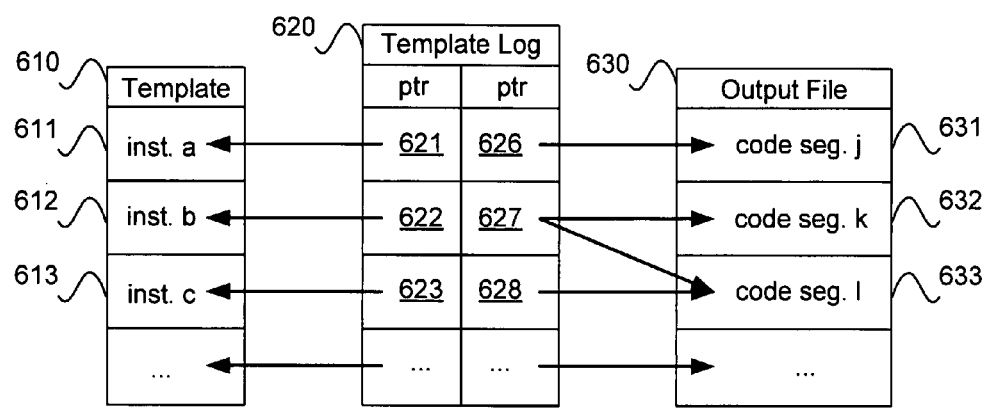
FIG. 6 is an example of a template log according to one embodiment of the present invention.

FIG. 6 is an example of a template log according to one embodiment of the present invention. Through the use of pointers, template log 620 maps instructions from template 610 to corresponding code segments in output file 630. This mapping may be used by a debugger to trace a problematic code segment from output file 630 to the instruction or data element used in generating that code. In this example, template 610 includes sequential instructions 611 to 613 and output file 630 includes code segments 631 to 633. Processing of instruction 611 ("inst. a") by a template engine generates code segment 631 ("code seg. j"). To preserve this mapping, pointer 621 points to instruction 611 and pointer 626 points to code segment 631. Similarly, code segments 632 ("code seg. k") and 633 ("code seg. l") are generated by the template of instruction 612 ("inst. b"). This mapping is preserved by pointer 622 pointing to instruction 612 and pointer 627 pointing to code segment 632 and 633. This process continues with instruction 613 ("inst. c") generating code segment 633 ("code seg. l"), pointer 623 pointing to instruction 613, and pointer 628 pointing to code segment 633.

Figure 7:
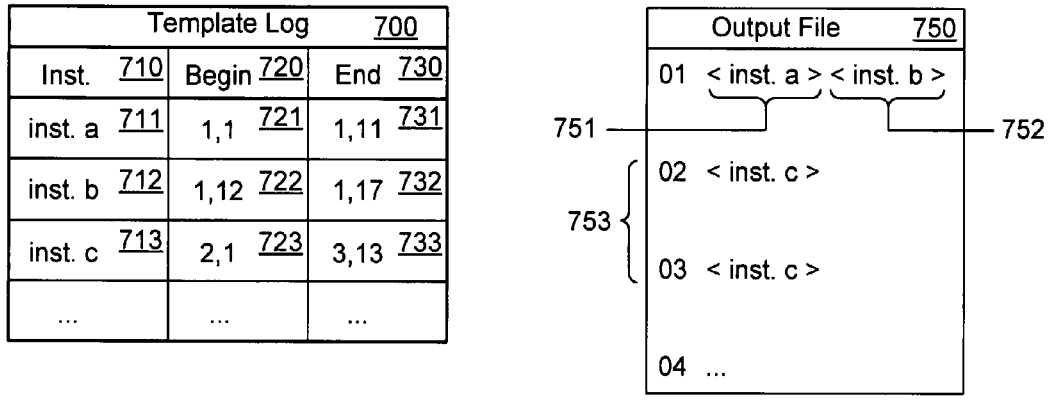
FIG. 7 is an example of a template log according to another embodiment of the present invention.

FIG. 7 is an example of a template log according to another embodiment of the present invention. Template log 700 maps instructions between a template and corresponding code segments in output file 750 by storing the code segments with indexes. Template log 700 includes instruction column 710, begin index column 720 and end index column 730. Instruction column 710 stores the instructions executed by a template engine. In one embodiment, the instructions are stored in column 710 at the beginning of execution. This preserves the order the template engine began instructions rather than the order it completed instructions, thereby preserving information relating to the processing stack. Begin index column 720 stores a first index describing a location in output file 750 where an instruction from column 710 may begin writing code to the output file. End index column 730 stores a second index describing a location in output file 750 where the same instruction from column 710 has finished writing data. Together, the three columns create rows describing the mapping between an instruction and corresponding code generated from the instruction. In this example, template log 700 includes three instructions listed under column 710. Instruction 711 ("inst. a") generates code segment 751 after it is executed by a template engine. Code segment 751 lies in the first line of output file 750 and is the first eleven characters of that line. This is stored in template log 700 as begin index 721 ("1,1") and end index 731 ("1,11"). The indexes include two numbers separated by a comma. The first number is the line number and the second number is the column number. Together, these two numbers describes the exact location of the code segment in output file 750. In this example, the output generated by instruction 711 begins at line 1, column 1 and is therefore stored in begin index 721 as "1,1." Similarly, the output generated by instruction 711 ends at line 1, column 11 and therefore, is stored in end index 731 as "1,11." In one embodiment, the template log is only partially filled during the execution of the instruction. For example, instruction 711 and begin index 721 are populated during the execution of instruction 711 and end index 731 is populated only after execution of instruction 711 is completed. In some applications, one instruction may be completed after the execution and logging of one or more other instructions. Here, instruction 711 is completely executed and the next instruction is then processed. The next instruction to be executed is instruction 712 ("inst. b"). This generates code segment 752. Code segment 752 begins at line 1, column 12 and ends at line 1, column 17. This code segment is mapped to instruction 712 through begin index 722 ("1,12") and end index 732 ("1,13"). The final instruction to be executed is instruction 713 ("inst. c"). Instruction 713 generated code segment 753, which spans over two lines. It begins on line 2, column 1 and ends on line 3, column 13. The mapping is stored as begin index 723 ("2,1") and end index 733 ("3,13"). This mapping method may continue until all instructions in the template have been executed. Although a model log example was not shown, one skilled in the art would also be able to generate a model log that maps data elements and code segments using similar indexes.

Figure 8:
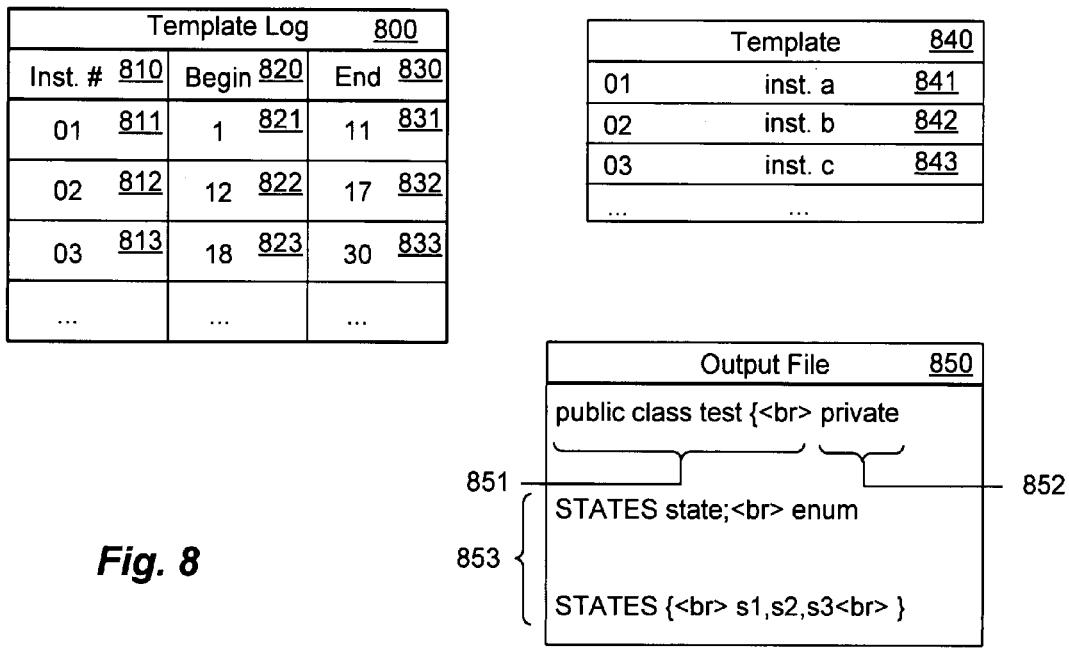
FIG. 8 is an example of a template log according to another embodiment of the present invention.

FIG. 8 is an example of a template log according to another embodiment of the present invention. Similar to FIG. 7, template log 800 maps instructions from a template to corresponding code segments in output file 850 by storing the code segments through indexes. Template log 800 includes instruction number column 810, begin index column 820, and end index column 830. Instruction number column 810 stores the instruction number rather than the instruction itself. This may create a more compact template log in exchange for an extra look-up step during tracing. Begin index column 820 stores a first value describing a location in output file 850 where an instruction from template 840 may being writing data. In this example, output file 850 stores all its data in a single line, thereby removing the need for both a row and a column index as in begin index 720 in FIG. 7. This further simplifies template log 800 as compared to template log 700 in FIG. 7. Similarly, end index 830 also only requires one value to store a location in output file 850 where the same instruction from template 840 has finished execution. In this example, template 840 contains 3 instructions 841 to 843. As a template engine begins execution of instruction 841 ("inst. a"), the value "01" is stored at instruction line 811 indicating it is the first instruction of template 840 and the value "1" is stored at begin index 821 indicating data generated from instruction 841 will begin writing at the first column in output file 850. Once execution of instruction 841 has completed generating code segment 851, the column where code segment 851 ends is stored at end index 831. Therefore, the row including 811, 821, and 831 describes the mapping between instruction 841 and code segment 851. Similarly, the second instruction 842 ("inst. b") is stored as "02" at instruction line 812 and begin index 822 stores the value "12" since it is the column where instruction 842 will begin writing code segment 852 in output file 850. Once execution of instruction 842 has completed, the value of 17 indicating the position that code segment 852 completed writing is stored at end index 832. This continues with instruction 843 ("inst. c") stored as "03" in 813, value "18" stored as begin index 823, generation of code segment 853, and value "30" stored as end index 833.

Figure 9:
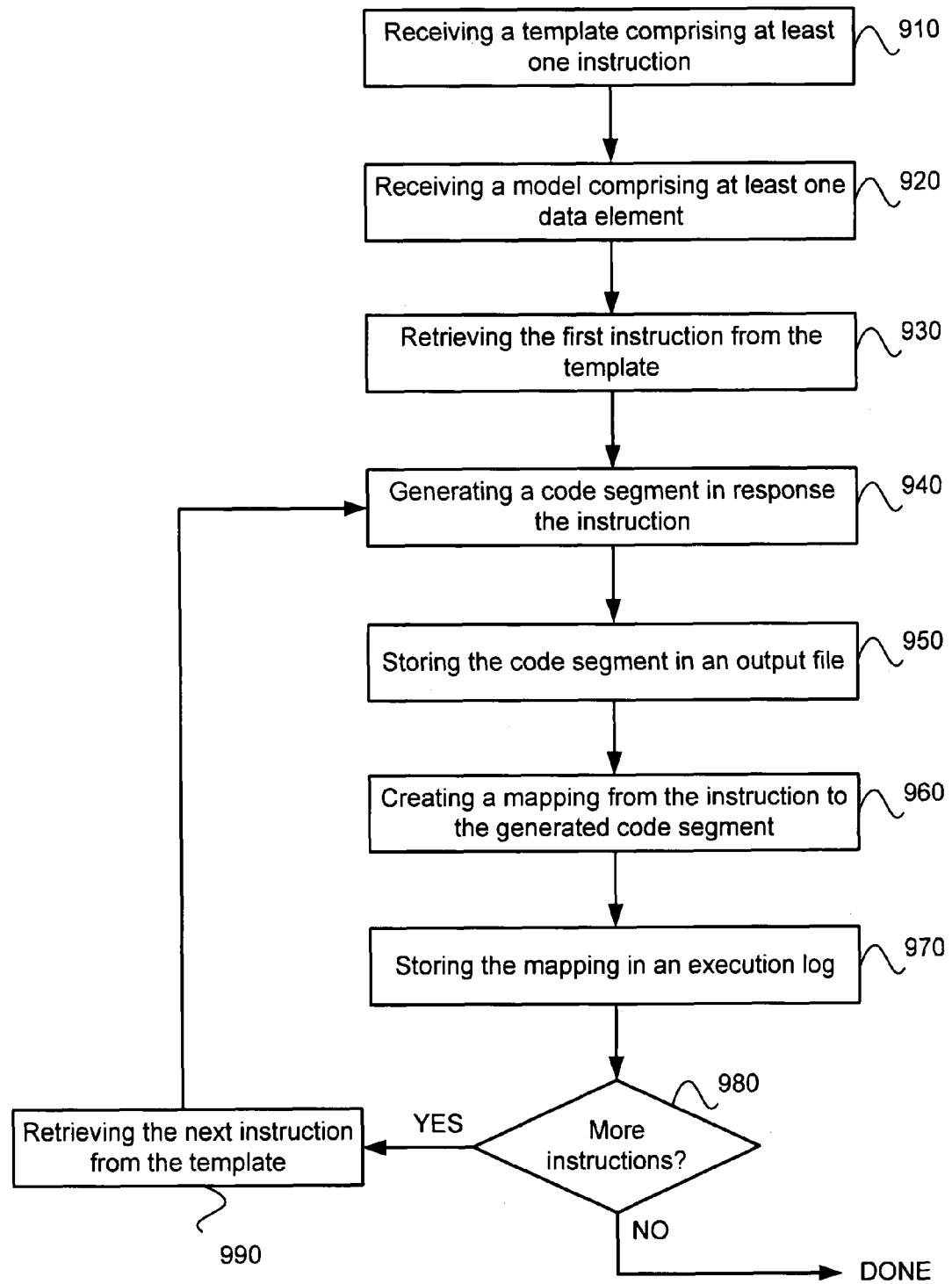
FIG. 9 is a flowchart of a method of generating code in a template engine according to one embodiment of the present invention.

FIG. 9 is a flowchart of a method of generating code in a template engine according to one embodiment of the present invention. In step 910, the template engine receives a template comprising at least one instruction. The instruction may be a static text instruction, modularization instruction, flow instruction or an access instruction. The template engine also receives a model comprising at least one data element in step 920. The data element may be required during the execution of an instruction in the template. In step 930, the first instruction from the template is retrieved. In step 940, a code segment is generated in response to the instruction. The generated code segment may also be dependent on other instructions or data elements. For example, the execution of an instruction may call upon other instructions or data elements. In step 950, the code segment is stored in an output file. In one embodiment, the code segment is stored in the output file as a single line with line breaks. In another embodiment, the code segment is stored the output file in lines and columns. In step 960, a mapping from the instruction to the generated code segment is created. This mapping may be creating using a combination of the examples discussed above. In step 970, the mapping is stored in an execution log. The format of the execution log may depend on the format of the mapping. In step 980, the system determines if there are more unexecuted instructions in the template. If there are, the next instruction from the template is retrieved in step 990 and processing of the instruction continues in step 940. If all the instructions of the template have been executed, then the template engine has finished its processing.

Figure 10:
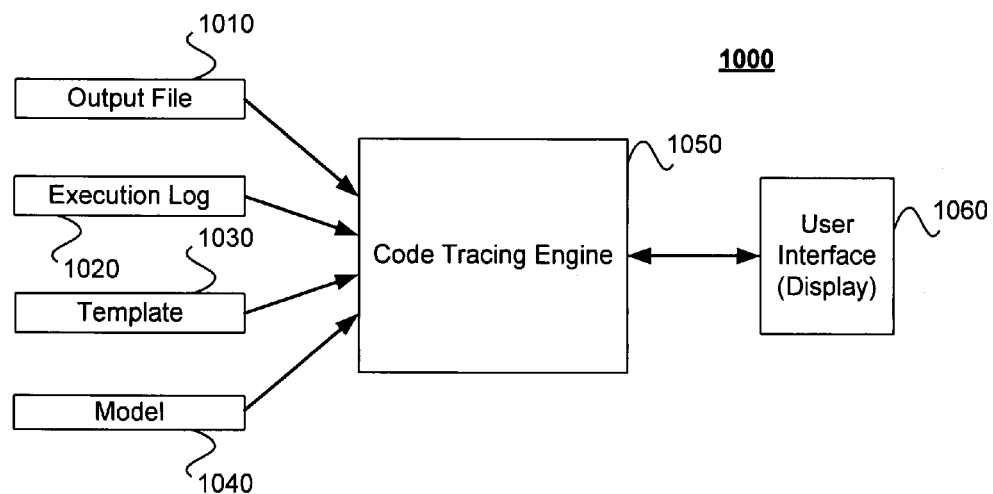
FIG. 10 is a system for tracing generated code according to one embodiment of the present invention.

FIG. 10 is a system for tracing generated code according to one embodiment of the present invention. System 1000 includes code tracing engine 1050 that receives output file 1010, execution log 1020, template 1030, and model 1040. In one embodiment, a template engine similar to 330 in FIG. 3 receives template 1030 and model 1040 as inputs, and generates output file 1010 and execution log 1020. Code tracing engine 1050 may use these four files to determine the instructions from template 1030 and the data elements from model 1040 that were used in generating a segment of code from output file 1010. This may be advantageous in the debugging process since by selecting an incorrectly generated segment of code, the code tracing engine traces the incorrect code segment back to the instructions and data elements that were used in generating that segment. This may allow a programmer to quickly spot and correct errors in the instructions or data elements.

User interface 1060, including a display, for example, is coupled to code tracing engine 1050 to allow a user to send information to and receive information from code tracing engine 1050. In one embodiment, display 1060 may allow the user to view the information from output file 1010, execution log 1020, template 1030, and model 1040 simultaneously. Viewing the information simultaneously may be advantageous because it simplifies the task of tracking the relationships between the files. In another embodiment, display 1060 may allow the user to select a code segment from output file 1010 to trace back to the instructions and data elements that were used in generating that code segment. In one embodiment, it is desirable to combine code tracing engine 1050 and display 1060 with template engine 330 of FIG. 3 and log generator 340 of FIG. 3, thereby providing debugging tools during code generation.

Figure 11:
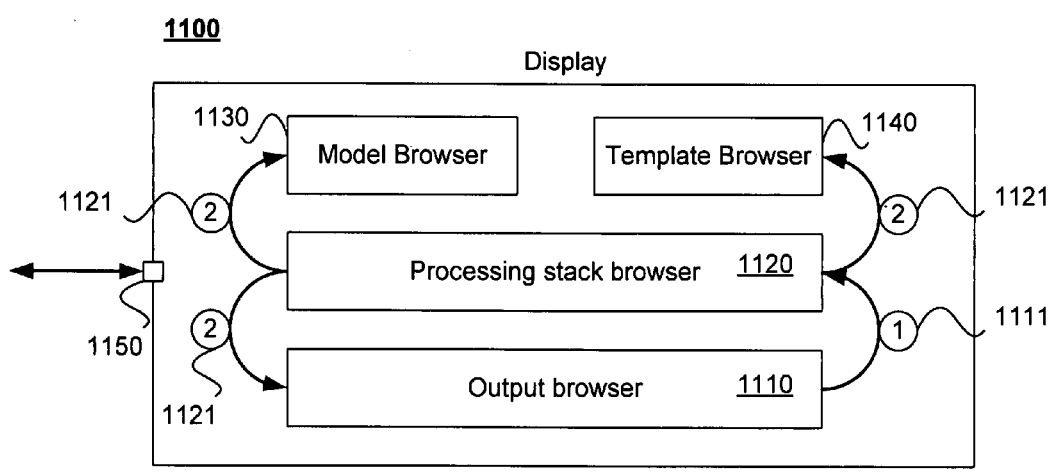
FIG. 11 is a display for tracing generated code according to one embodiment of the present invention.

FIG. 11 is a display for tracing generated code according to one embodiment of the present invention. Display 1100 provides an interface for simultaneous viewing of information from the template, model, output file, and execution log. In this example, information from the output log is displayed on output browser (e.g., a UI window) 1110, information from the execution log is displayed on processing stack browser 1120, information from the model is displayed on model browser 1130, and information from the template is displayed on template browser 1140. All this information may be received through port 1150. As used herein, the term port refers to a software port, channel, or logical coupling between information in the browsers. In one embodiment, there may be multiple ports supporting the transfer of information. For example, output browser 1110 may have a dedicated port for receiving information from the output file. Likewise, processing stack browser 1120, model browser 1130, and template browser 1140 may all have their own dedicated ports for receiving information. Port 1150 may also be used to send information from display 1100 to other components. In one example, port 1150 transmits a defective code segment from an output file through port 1150 to a code tracing engine to determine the instructions and data elements used in generating of the defective code segment.

In one embodiment, tracing a defective code segment from an output file may occur in two steps. In step 1111, a defective code segment from an output file is selected within 30 output browser 1110. In response to the selection, processing stack browser 1120 may display the processing stack of the defective code segment. In step 1121, an instruction from the processing stack is selected. In response to the selection, model browser 1130 may display the data elements accessed during execution of the instruction. Additionally, template browser 1140 may display the location of the selected instruction in the template while output browser 1110 displays the code segment generated from the execution of the selected instruction. In one embodiment, the display highlights the data elements accessed during execution of the instruction, the location of the instruction in the template, and the code segment generated from the execution of the instruction. This creates an effective user interface for understanding and troubleshooting the relationships between the inputs and outputs of a template engine.

Figure 12:
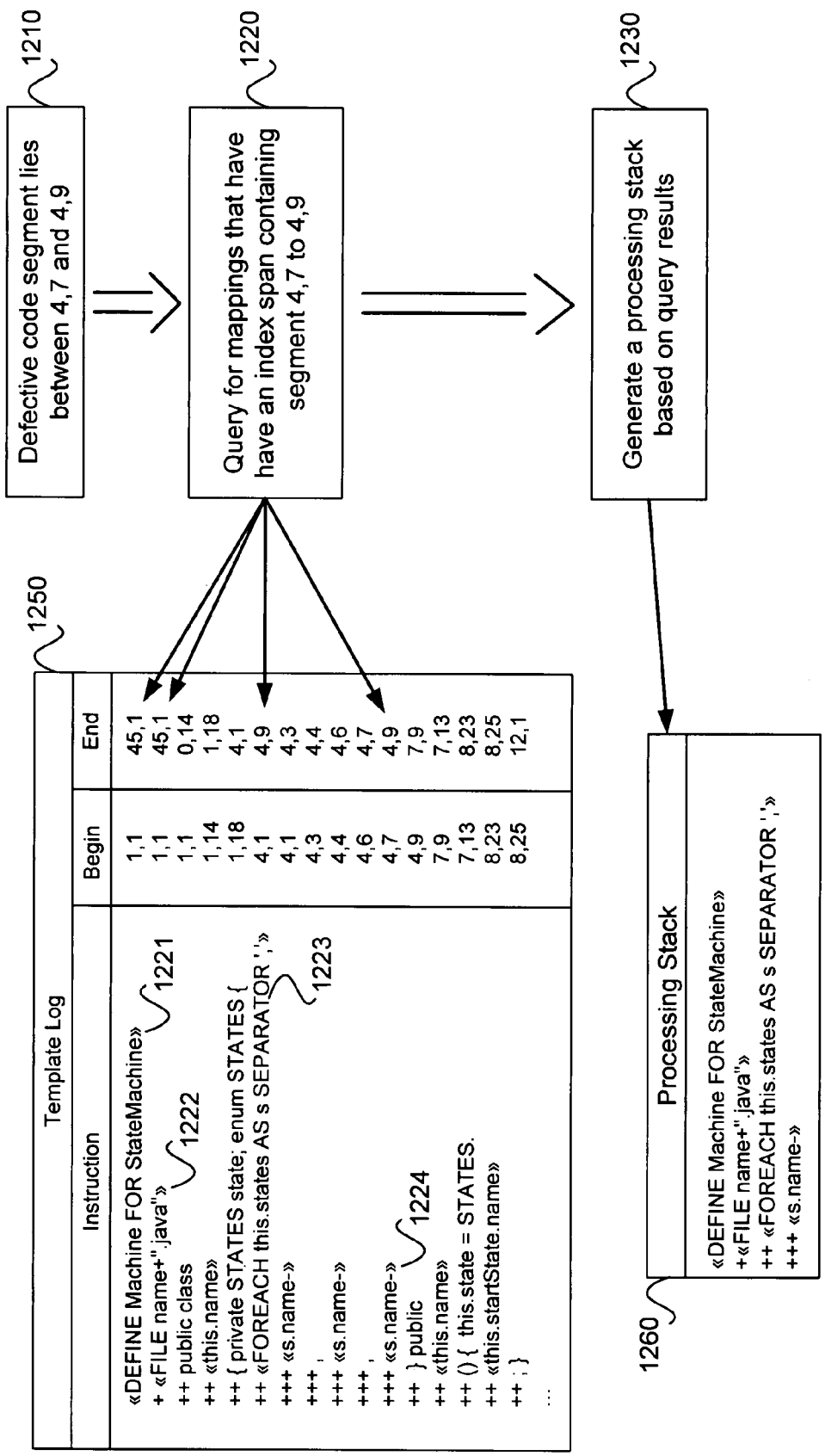
FIG. 12 illustrates an example of creating a processing stack according to one embodiment of the present invention.

FIG. 12 illustrates an example of creating a processing stack according to one embodiment of the present invention. In this example, processing stack 1260 is created through three steps. Step 1210 receives the location of a code segment selected by the user. The selected code segment, stored in the output file in column-line shown in FIG. 7, lies between 4,7 and 4,9. The second step, step 1220, queries template log 1250 for mappings that have an index span encompassing selected code segment 4,7 to 4,9. This query returns the group of mappings containing instructions 1221 to 1224. For example, the mapping containing instruction 1221 has a begin index of 1,1 and an end index of 45,1. This index range encompasses the index range 4,7 to 4,9 so therefore, instruction 1221 is responsible for the generation of that code segment. The same analysis may be performed for the mappings of instructions 1222 to 1224. In one embodiment, symbols, such as the "+" symbol, may prefix the instructions to illustrate modularization within the processing stack. In another embodiment, step 1220 may query a model log or an execution log for mappings that have an index span encompassing the selected code segment. In step 1230, a processing stack is generated based on the query results of step 1220. In this example, processing stack 1260 contains the four instructions 1221 to 1224. This processing stack may then be sent to a display to notify a user that the selected code segment depends on the instructions listed in the stack.

Figure 13:
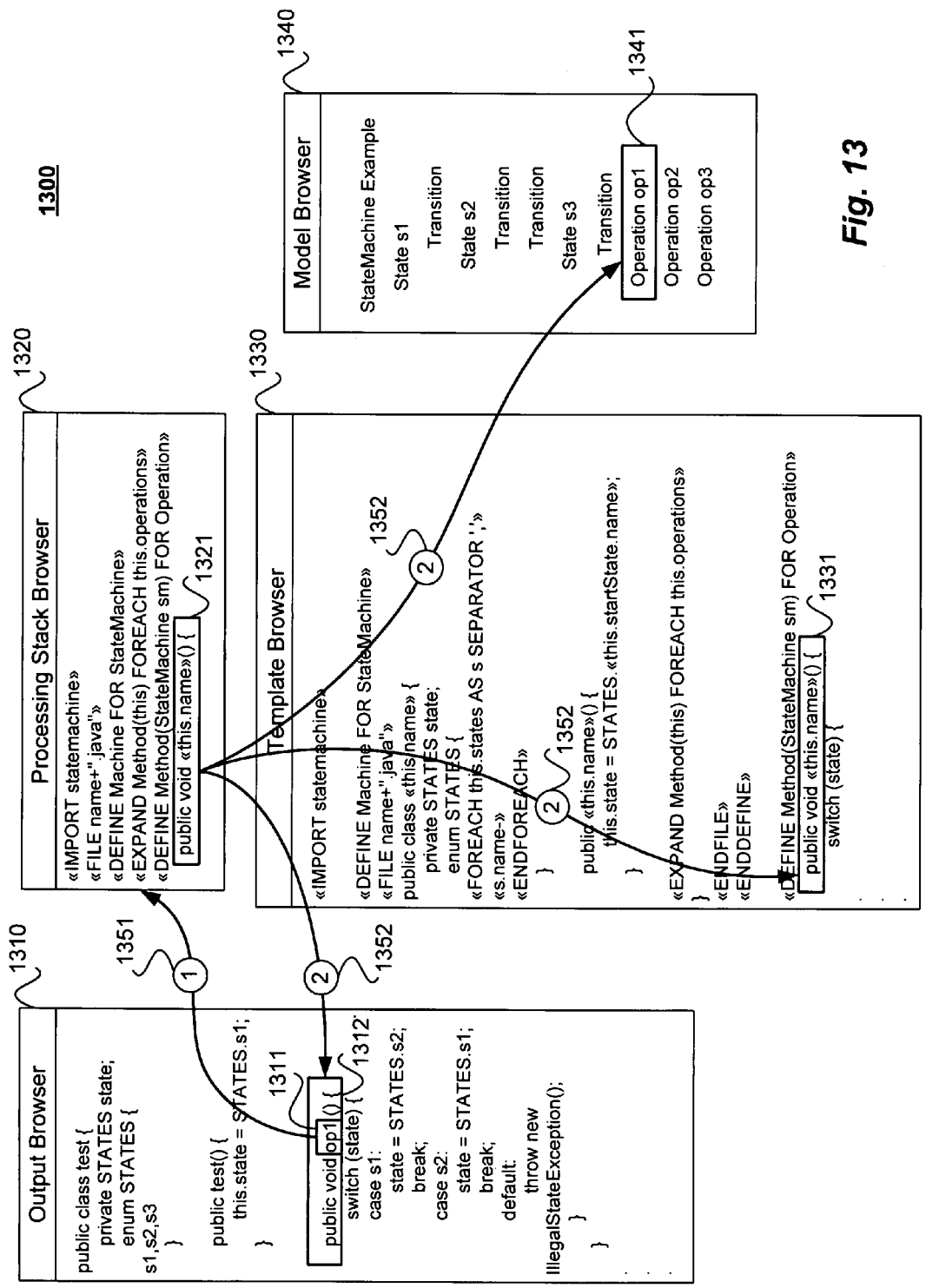
FIG. 13 is an example of a display for tracing generated code according to one embodiment of the present invention.

FIG. 13 is an example of a display for tracing generated code according to one embodiment of the present invention. Display 1300 includes output browser 1310, processing stack browser 1320, template browser 1330, and model browser 1340. In this example, a user views the output file in output browser 1310 and notices an error with code segment 1311 ("op1"). By selecting on code segment 1311 as illustrated at 1351, the user is able to view the processing stack of the code segment in processing stack browser 1320. While examining the instructions in processing stack browser 1320, the user decides that instruction 1321 ("public void <<this.name>>( ) {") may be the source of the error. By highlighting or otherwise selecting instruction 1321 as illustrated at 1352, a variety of information is available to the user. For example, instruction 1331 ("public void <<this.name>>( ) {") may be highlighted in template browser 1330 to show the source of instruction 1321. Additionally, data element 1341 ("Operation op1") may be highlighted to illustrate that data element 1341 was accessed during the execution of instruction 1321. Furthermore, code segment 1312 ("public void op1( ) {" may be highlighted to illustrate the code segment generated after the execution of instruction 1321.

Figure 14:
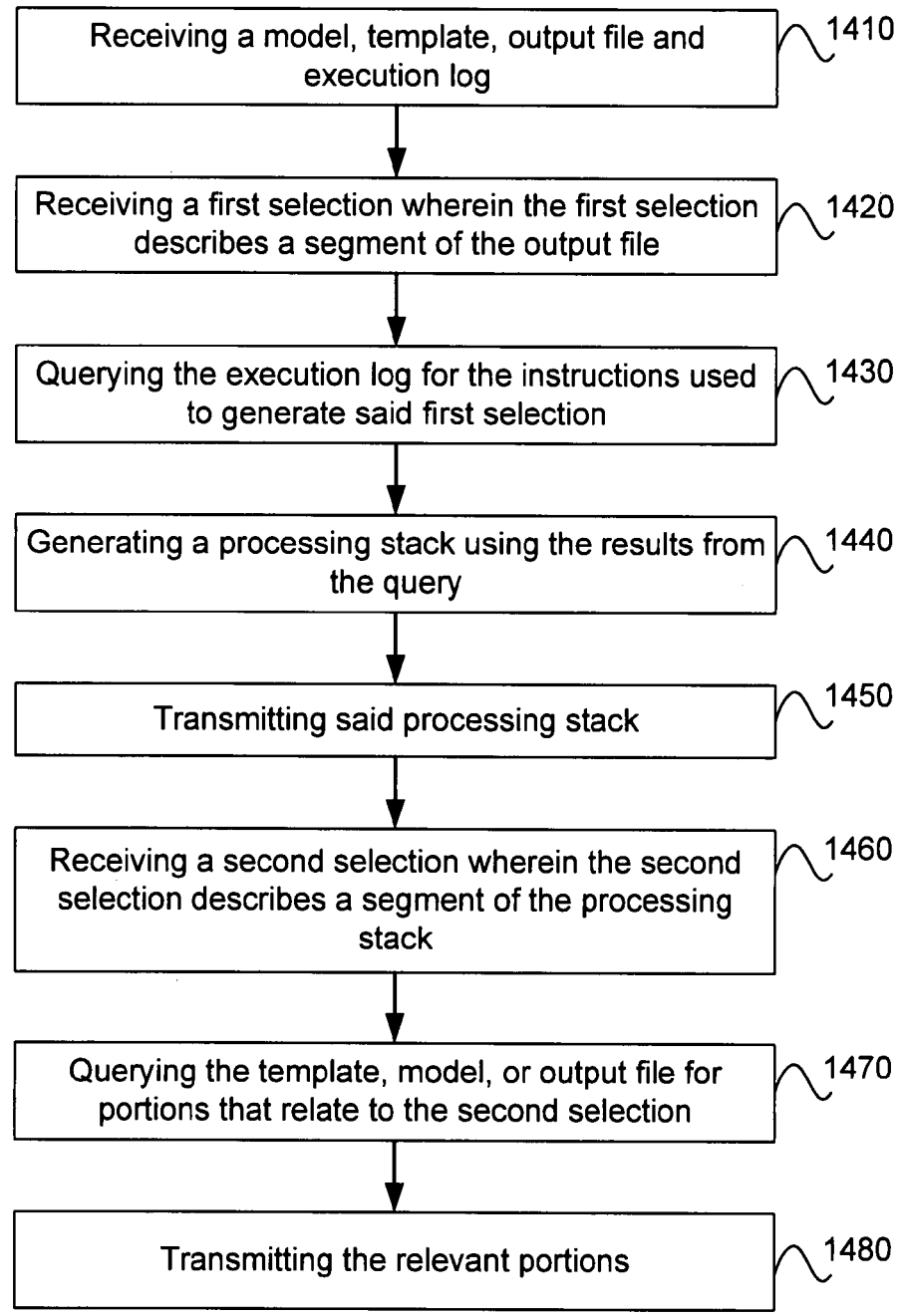
FIG. 14 is a flowchart of a method of tracing generated code according to one embodiment of the present invention

FIG. 14 is a flowchart of a method of tracing generated code according to one embodiment of the present invention. In step 1410, the tracing engine receives a model, template, output file, and execution log. In one embodiment, the output file and execution log are generated from the model and the template through the use of a template engine. In step 1420, the tracing engine receives a first selection wherein the first selection describes a segment of the output file. In one embodiment, the first selection may be received as a portion of code existing in the output file. In another embodiment, the first selection may be received as a set of indexes. Upon receiving the segment, the tracing engine may query the execution log for the instruction used to generate the first selection. This occurs in step 1430. The querying may depend on the format of the execution log and the format of the first selection received. If the formats are similar, then an extra conversion may not be required. For example, if the format of the first selection is an index range and the format of the execution log is an instruction followed by a begin and an end index (i.e. template log in FIG. 7), then querying may comprise searching for instructions that contain a begin and end index outside the boundaries of the index range. However if the format of the first selection is an index range and the format of the execution log is an instruction followed by a pointer, then querying may comprise an extra step of determining the pointer value for the index range. In step 1440, a processing stack is generated based on the results from the query. This processing stack may include one or more instructions from the template. In one embodiment, special characters are used to distinguish between different levels in a modularized instruction set. After the processing stack is created, it is transmitted from the tracing engine to another component in step 1450. The processing stack may be transmitted as actual instructions. The processing stack may also be transmitted as a line number of an instruction belonging to the template.

The component receiving the processing stack may respond by sending a second selection. In step 1460, the tracing engine receives this second selection wherein the second selection describes a segment of the processing stack. This segment may be an instruction from the processing stack. In one embodiment, the second selection may be received as a line number of an instruction belonging to the template. This may decrease the amount of information transmitted between the component and the tracing engine. In another embodiment, the second selection received may be an actual instruction from the template. After receiving the second selection, the tracing engine may query the template, model, or output file for portions that relate to the second selection. In one embodiment, the query may return an instruction from the template that illustrates the origin of the second selection. In another embodiment, the query may return a data element accessed while executing the second selection. In a third embodiment, the query may return a section of the output file that was generated by the second selection. Any portions related to the second selection may be transmitted from the tracing engine at step 480. These portions may serve as an illustration of information received by or information generated from the second selection.

Figure 15:
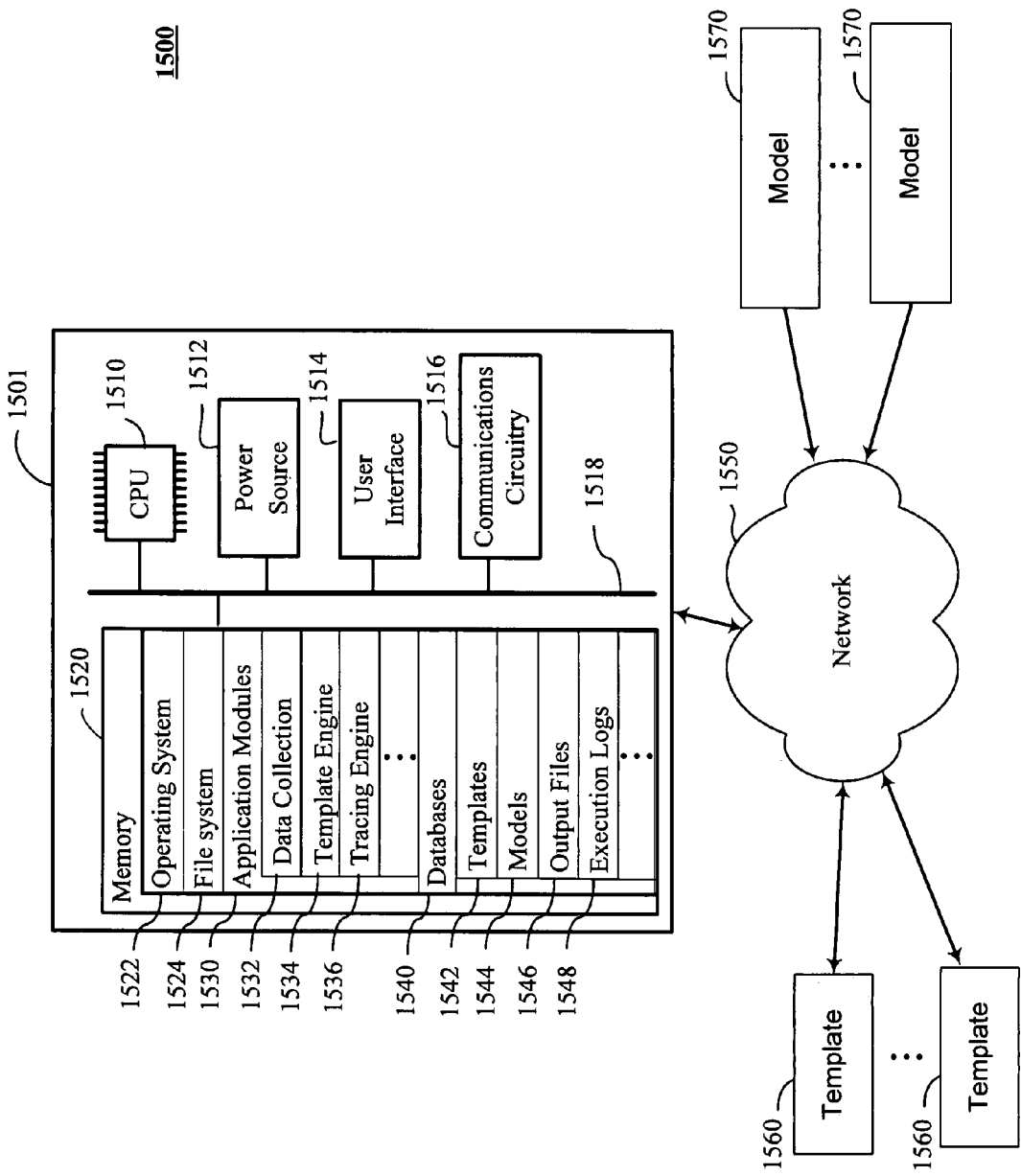
FIG. 15 is a schematic diagram of a code generating system and server according to one embodiment of the present invention.

FIG. 15 is an example of a code generation and code tracing system according to one embodiment of the present invention. Computer system 1500 comprises a code generation and code tracing system 1501 in communication over a network 1550 with templates 1560 and models 1570.

Network 1550 can comprise one or more wired or wireless networks, e.g., the internet or other wide area network (WAN), one or more local area networks, wired or wireless telephone networks (e.g., a telephone network, a voice over integrated packet (VOIP) network, or a GSM, PCS, mobitex, CDMA, TDMA or other network for voice and/or data communications).

In some embodiments, computer system 1501 may comprise a central processing unit 1510, a power source 1512, user interface 1514, communications circuitry 1516, and at least one memory 1520. Memory 1520 may comprise volatile and non-volatile storage units, for example hard disk drives, random-access memory (RAM), read-only memory (ROM), flash memory and the like. In preferred embodiments, memory 1520 comprises high-speed RAM for storing system control programs, data, and application programs, e.g., programs and data loaded from non-volatile storage. System 1501 includes a user interface 1514, which may comprise one or more input devices, e.g., keyboard, key pad, mouse, scroll wheel, and the like, and a display or other output device. A network interface card or other communication circuitry 216 may provide for connection to any wired or wireless communications network 1550, which may include the internet and/or any other wide area network. Internal bus 1518 provides for interconnection of the aforementioned elements of system 1501.

Operation of system 1501 is controlled primarily by an operating system 1522, which is executed by central processing unit 1510. Operating system 1522 can be stored in system memory 1520. In addition to operating system 1522, in a typical implementation system memory 1520 may include a file system 1524 for controlling access to the various files and data structures used by the present invention, one or more application modules 1530, and one or more databases or data modules 1540.

The applications modules 1530 may comprise one or more of the following:
 a data collection module 1532 for collecting data from data providers including models and templates;
 a template engine 1534 for generating output files and execution logs; and
 a tracing engine 1536 for debugging output files.

The one or more databases 1540 may include any number of data files, tables and/or other structures, including for example, templates 1542, models 1544, output files 1546, and execution logs 1548. Templates 1542 may include definitions of how an output file is constructed. For example, the templates may describe source code in a particular programming language or the format of a configuration file. Models 1544 may include, for example, state machines, and/or parameters related to templates 1542. Output files 1546 may include results generated from template engine 1534 by templates 1542, e.g., generated source code or configuration files. Execution logs 1548 may include mappings between templates 1542 and models 1544.

In some embodiments, each of the aforementioned data structures stored or accessible to system 1501 are single data structures. In other embodiments, any or all such data structures may comprise a plurality of data structures (e.g., databases, files, archives) that may or may not all be stored on system 1501. For example, in some embodiments, databases 1540 comprise a plurality of structured and/or unstructured data records that are stored on computer 1501 and/or on computers that are addressable by computer 1501 across the network 1550.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of tracing code generation comprising:
 receiving a template comprising one or more instructions;

receiving a model comprising one or more data elements;
generating, by a computer system, an output file, wherein the output file is generated in response to the template and the model; and
generating, by the computer system, an execution log, wherein the execution log maps a first code segment from the output file to a first instruction belonging to said template, and wherein the execution log maps the first code segment from the output file to a first data element belonging to said model, and wherein the first data element corresponds to a state machine.

2. The method of claim 1 wherein the execution log stores one or more of the first instruction, the first data element, and the first code segment of the output file.

3. The method of claim 2 wherein one or more of the first instruction, the first data element, and the first code segment are stored using pointers.

4. The method of claim 2 wherein one or more of the first instruction, the first data element, and the first code segment are stored using an index.

5. A computer-implemented method of tracing code generation comprising:
receiving a template comprising one or more instructions;
receiving a model comprising one or more data elements;
generating, by a computer system, an output file, wherein the output file is generated in response to the template and the model; and
generating, by the computer system, an execution log, wherein the execution log maps a first code segment from the output file to a first instruction belonging to said template, wherein the execution log maps the first code segment from the output file to a first data element belonging to said model, and
wherein the first instruction retrieves the first data element from said model.

6. A computer-implemented method of tracing code generation comprising:
receiving a template comprising one or more instructions;
receiving a model comprising one or more data elements;
generating, by a computer system, an output file, wherein the output file is generated in response to the template and the model; and
generating, by the computer system, an execution log, wherein the execution log maps a first code segment from the output file to a first instruction belonging to said template, wherein the execution log maps the first code segment from the output file to a first data element belonging to said model, and
wherein the first instruction manipulates the first data element received from said model.

7. A computer-implemented method of tracing code generation comprising:
receiving a template comprising one or more instructions;
receiving a model comprising one or more data elements;
generating, by a computer system, an output file, wherein the output file is generated in response to the template and the model; and
generating, by the computer system, an execution log, wherein the execution log maps a first code segment from the output file to a first instruction belonging to said template, wherein the execution log maps the first code segment from the output file to a first data element belonging to said model, and
wherein the execution log stores the first instruction and the first code segments of the output file.

8. The method of claim 7 wherein the first code segment of the output file is stored as a begin index and an end index.

9. The method of claim 7 wherein the first instruction is stored as an index into the template.

10. The method of claim 7 wherein the first instruction and the first code segment are stored as pointers.

11. A computer system apparatus including software for tracing code generation comprising:
a computer system;
a template engine, executing on the computer system, wherein the template engine receives a template and generates an output file comprising a plurality of code segments. and wherein the template engine accesses a model comprising one or more data elements specified by the template;
a log generator, executing on the computer system, for generating an execution log, wherein the execution log includes a mapping from a first code segment in the output file to at least one instruction from the template used to generate the first code segment, and wherein the execution log further includes a mapping from the first code segment in the output file to a first data element belonging to said model, and wherein the first instruction manipulates the first data element received from said model; and
a code tracing engine, executing on the computer system, wherein the code tracing engine receives the template, the output file, the execution log, and the model, and determines the at least one instruction in the template and the first data element in the model used in generating the first code segment of the output file.

12. The apparatus of claim 11 further comprising an output browser for displaying code segments and a processing stack browser for displaying at least a portion of the execution log.

13. The apparatus of claim 11 further comprising a template browser that displays the at least one instruction in the template used in generating the first code segment of the output file.

14. The apparatus of claim 11 further comprising a model browser for displaying at least a portion of the model, wherein the model browser displays at least one data set corresponding to the execution of the at least one instruction.

15. A computer-readable medium containing instructions for controlling a computer system to perform a method of tracing generated code, the method comprising:
displaying an output file, wherein the output file comprises a first code segment generated in response to at least one instruction in a template and at least one data set in a model;
displaying an execution log, wherein the execution log includes the at least one instruction and the at least one data set used to generate the first code segment;
displaying at least a portion of the model;
displaying at least a portion of the template; and
selecting the first code segment, and in accordance therewith, identifying the at least one instruction in the execution log and the template and identifying the at least one data set in the execution log and the model.

16. The computer-readable medium of claim 15 wherein the execution log is generated by a template engine, wherein the execution log specifies a mapping from the first code segment to at least one instruction in the template used to generate the first code segment.

17. The computer-readable medium of claim 15 wherein the output file is displayed in a first browser, the execution log is displayed in a second browser, the model is displayed in a third browser, and the template is displayed in a fourth browser.

18. The computer-readable medium of claim 17 wherein the method further comprises selecting at least one instruction in the second browser, and in accordance therewith, identifying the at least one instruction and the at least one data set in the model and the template and identifying the first code segment generated in response to at least one instruction.

19. The computer-readable medium of claim 17 wherein the method further comprises selecting at least one data set in the third browser corresponding to the execution of the first instruction, and in accordance therewith, identifying the at least one instruction in the template and execution log, identifying the at least one data set in the execution log, and identifying the first code segment generated in response to at least one instruction in the output file.

20. The computer-readable medium of claim 17 wherein the method further comprises selecting at least one instruction in the fourth browser, and in accordance therewith, identifying the at least one instruction in the execution log and identifying the first code segment generated in response to at least one instruction in the output file.

* * * * *